(12) United States Patent
Odate et al.

(10) Patent No.: US 9,457,740 B2
(45) Date of Patent: Oct. 4, 2016

(54) VEHICLE CONTROL SYSTEM

(75) Inventors: Shotaro Odate, Saitama (JP); Yo Ito, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 203 days.

(21) Appl. No.: 13/981,167

(22) PCT Filed: Jan. 30, 2012

(86) PCT No.: PCT/JP2012/000560
§ 371 (c)(1),
(2), (4) Date: Jul. 23, 2013

(87) PCT Pub. No.: WO2012/105215
PCT Pub. Date: Aug. 9, 2012

(65) Prior Publication Data
US 2013/0304277 A1 Nov. 14, 2013

(30) Foreign Application Priority Data

Jan. 31, 2011 (JP) .................................. 2011-018858

(51) Int. Cl.
*G05D 1/00* (2006.01)
*G05D 3/00* (2006.01)
(Continued)

(52) U.S. Cl.
CPC ............ *B60R 16/02* (2013.01); *H04L 9/3226* (2013.01); *H04L 12/2818* (2013.01); *H04L 67/125* (2013.01); *G07C 2205/02* (2013.01); *H04L 63/0884* (2013.01); *H04L 2012/40215* (2013.01);
(Continued)

(58) Field of Classification Search
CPC ............ B60R 16/02; G07C 2205/02; H04L 2012/40215; H04L 2012/40273; H04L 2209/84; H04L 67/125; H04L 9/3226; H04W 12/06

USPC .............................................. 701/1
See application file for complete search history.

(56) References Cited

U.S. PATENT DOCUMENTS 5,787,367 A * 7/1998 Berra ...................... B60R 25/04
380/28
8,095,263 B2 * 1/2012 Yasue ..................... B60R 25/04
340/3.42
(Continued)

FOREIGN PATENT DOCUMENTS

JP          2006-182138 A     7/2006
JP          2008-090603 A     4/2008
(Continued)

*Primary Examiner* — Khoi Tran
*Assistant Examiner* — Harry Oh
(74) *Attorney, Agent, or Firm* — Carrier Blackman & Associates, P.C.; William D. Blackman; Jingli Wang

(57) ABSTRACT

The control property of an onboard device is changeable by using an external control unit, and the data from the external control unit is authenticated. An onboard gateway unit is provided with a verification code generator for generating a security key, and an external control unit is provided with an application control unit for generating a security key. When the external control unit is connected, a main control logic unit of the gateway unit compares the two keys, and when the keys are verified, the control by the external control unit using an application program is enabled. The onboard device control unit can be easily connected to the external control unit. As the control of the device control unit by an external control signal is enabled only when verified, an unauthorized access can be prohibited, and the onboard deice can be controlled only by an authorized control signal.

10 Claims, 5 Drawing Sheets

(51) Int. Cl.
  *G06F 7/00* (2006.01)
  *G06F 17/00* (2006.01)
  B60R 16/02 (2006.01)
  *H04L 9/32* (2006.01)
  *H04L 29/08* (2006.01)
  *H04L 12/28* (2006.01)
  *H04L 29/06* (2006.01)
  *H04W 12/06* (2009.01)
  *H04L 12/40* (2006.01)

(52) U.S. Cl.
  CPC .. *H04L 2012/40273* (2013.01); *H04L 2209/84* (2013.01); *H04W 12/06* (2013.01)

(56) References Cited

U.S. PATENT DOCUMENTS

| | | | | | |
|---|---|---|---|---|---|
| 8,306,521 | B2 * | 11/2012 | Ban | ................ | G06F 21/572 455/418 |
| 8,565,962 | B2 * | 10/2013 | Yoshiyama | ........ | G05B 19/0426 307/10.1 |
| 8,848,608 | B1 * | 9/2014 | Addepalli | ............ | H04W 4/046 370/328 |
| 2001/0002814 | A1 * | 6/2001 | Suganuma | ......... | G05B 19/0426 340/5.74 |
| 2001/0021886 | A1 * | 9/2001 | Braun | ................ | B60R 25/04 701/1 |
| 2003/0004623 | A1 * | 1/2003 | Namaky | ............ | G07C 5/0808 701/32.7 |
| 2006/0041337 | A1 * | 2/2006 | Augsburger | ........ | F02D 41/2487 701/1 |
| 2006/0090077 | A1 * | 4/2006 | Little | ................ | G06F 21/10 713/184 |
| 2006/0142914 | A1 | 6/2006 | Yokogawa | | |
| 2008/0059806 | A1 * | 3/2008 | Kishida | ................ | G06F 21/35 713/186 |
| 2011/0083161 | A1 * | 4/2011 | Ishida | ................ | H04L 12/40 726/2 |
| 2011/0106340 | A1 * | 5/2011 | Vollmer | ................ | H04L 29/06 701/2 |

FOREIGN PATENT DOCUMENTS

| | | |
|---|---|---|
| JP | 2009-225385 A | 10/2009 |
| WO | 2009/147734 A1 | 12/2009 |

* cited by examiner

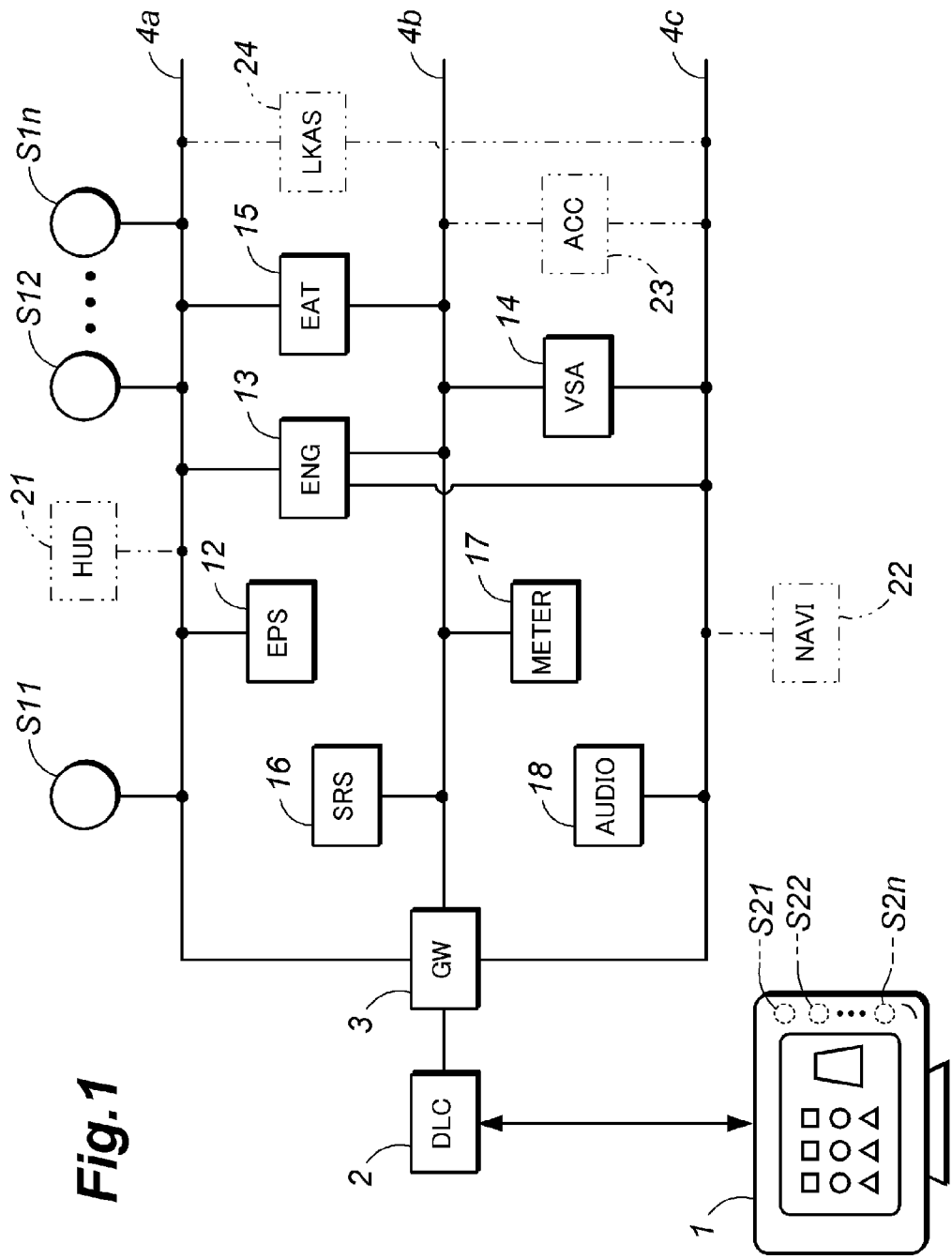

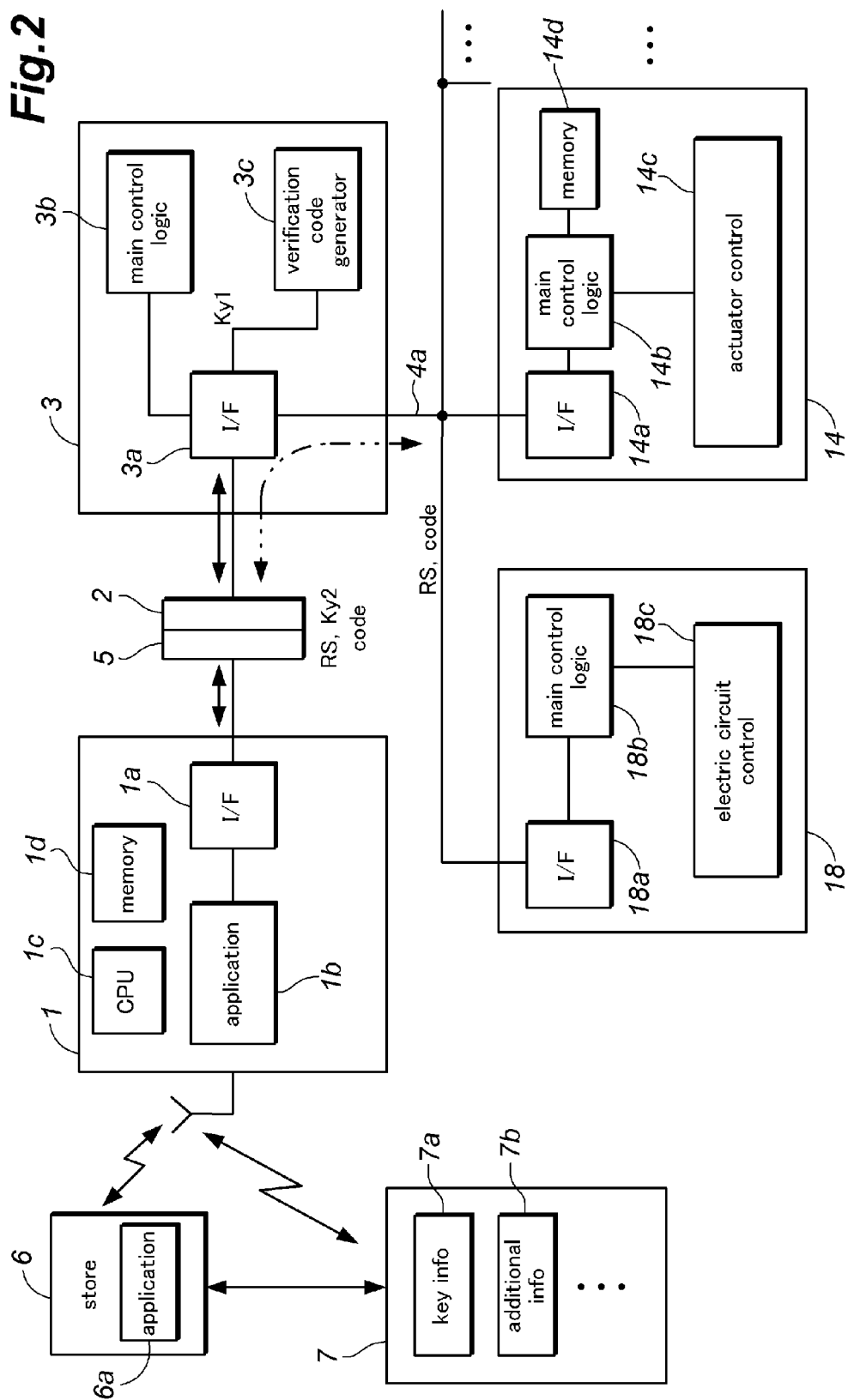

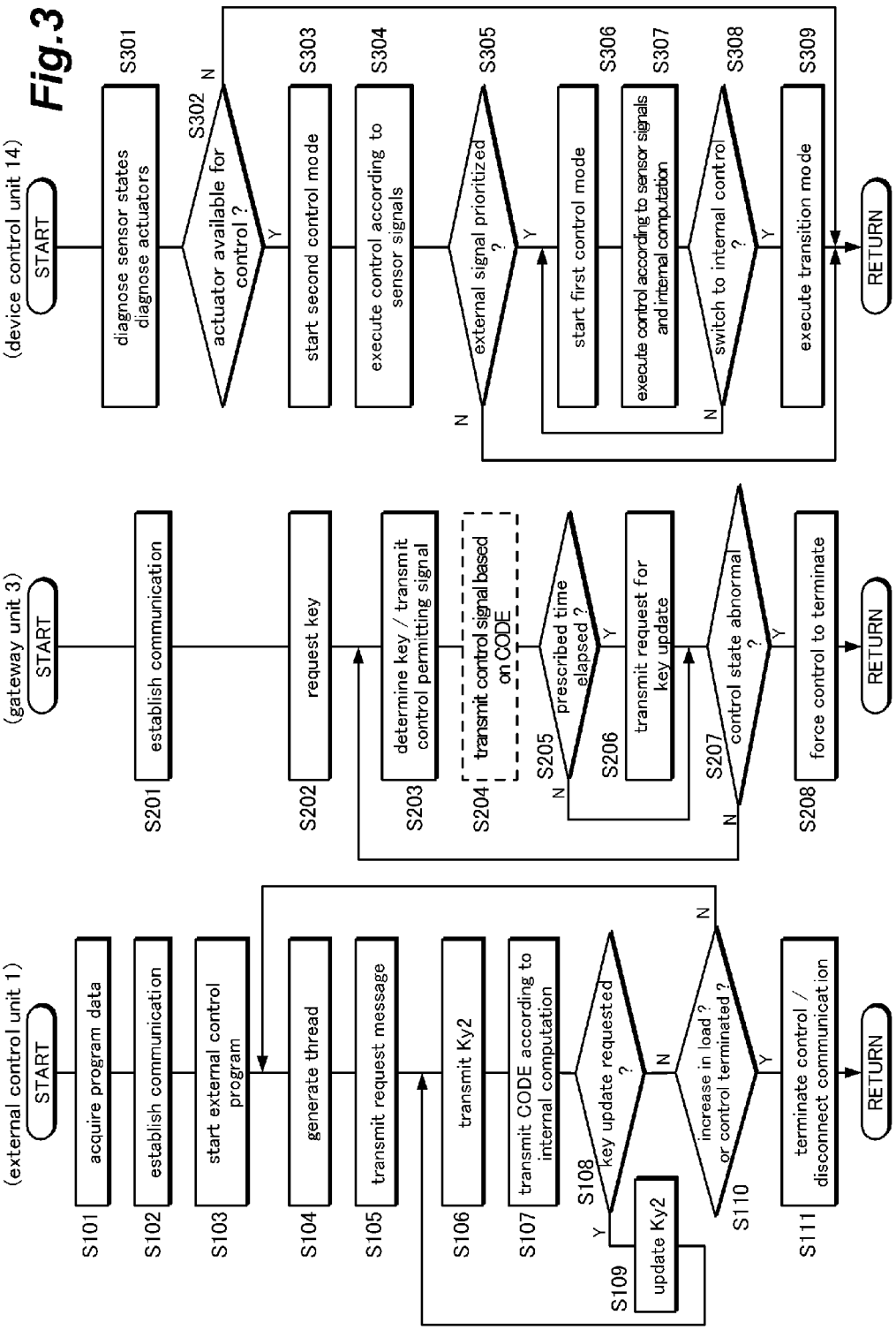

Fig.4 higher priority level for onboard devices ←

| | | second control mode | first control mode |
|---|---|---|---|
| ↑ higher priority level for control signals | layer 0 | • determine control execution priority<br>• ABS<br>• failure diagnosis<br>• brake assist | not executable |
| | layer 1 | • generative cooperation control<br>• AYC(VSA)<br>• TCS | • simple failure diagnosis<br>• applying sensor signal input<br>• changing control parameter (such as relation between stroke and brake force in by-wire control) |
| | layer 2 | • automatic braking<br>• brake feeling adjustment | • transmission of signal to outside<br>• automatic braking (such as cruise control, headway space control, and steering control for parking assist) |

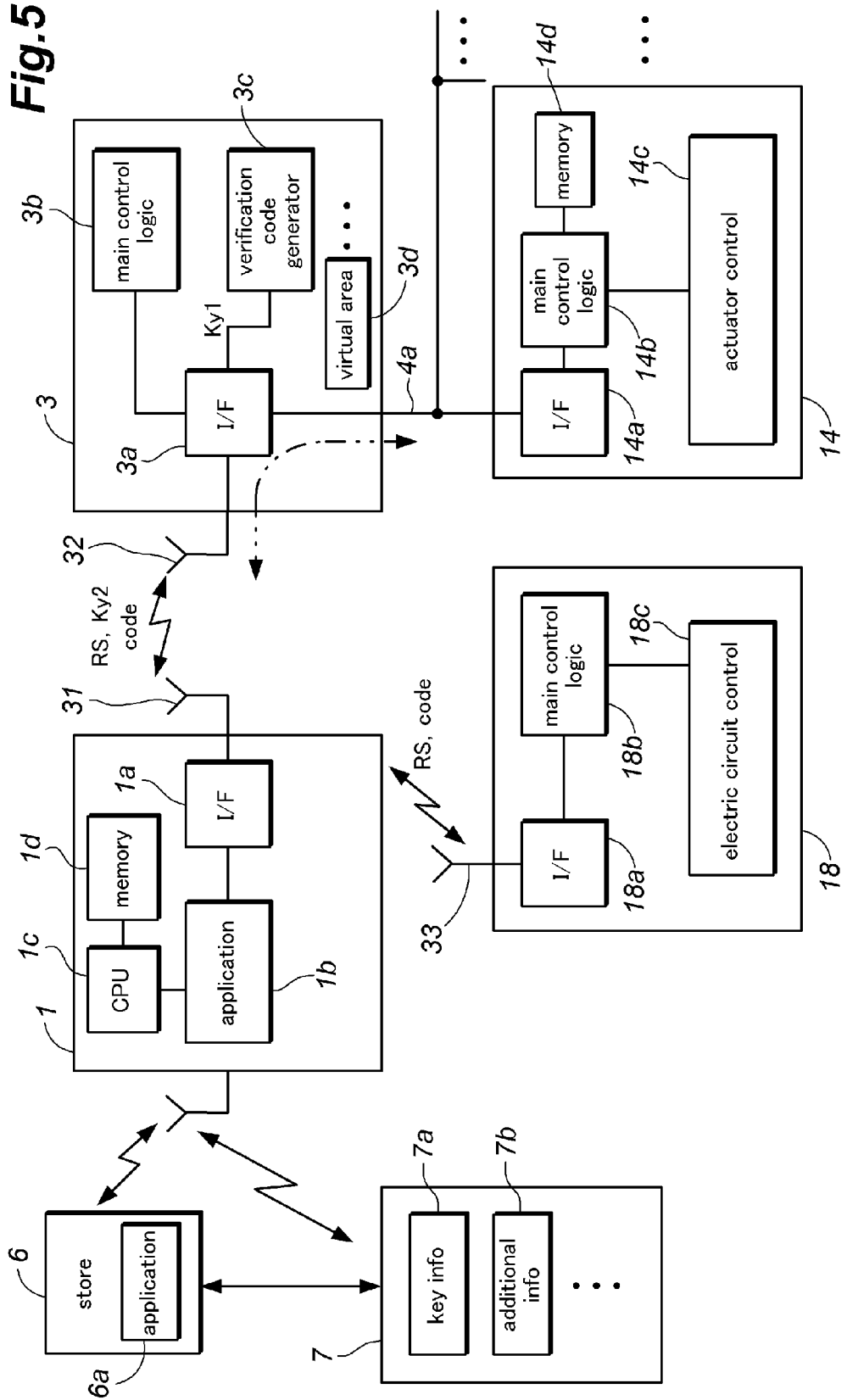

VEHICLE CONTROL SYSTEM

TECHNICAL FIELD

The present invention relates to a vehicle control system, and in particular to a vehicle control system that is configured to control a vehicle motion control device by using an external control unit.

BACKGROUND OF THE INVENTION

In some of the current motor vehicles that are e quipped with various onboard devices, the device control units for such onboard devices are enabled to communicate with one another via a network such as a CAN (controlled area network). The CAN may include a multiplex communication line serving as a common bus via which a plurality of nodes are connected to a recording device. The recording device collects data from the device control units, and may be detachably connected to the common bus via a connector so that the data collected by the recording device may be used for analyzing the behavior and the operating condition of the vehicle and diagnosing the failure of the vehicle (See patent document 1, for instance.).

PRIOR ART DOCUMENT(S)

Patent Document(S)

Patent Document 1: JP2006-182138

SUMMARY OF THE INVENTION

Task to be Accomplished by the Invention

The onboard devices of a motor vehicle include those that are related to the motion of the vehicle such as electric actuators for the engine and the suspension system, and those that are not related to the motion of the vehicle such as audio devices, a combination meter and a locking device. The onboard devices are controlled by corresponding device control units (each of which may be integrally packaged with the corresponding onboard device, and the device control units can communicate one another via the CAN.

As a failure of a device control unit for any of the electric actuators prevents the vehicle from running in a proper order, it is highly desirable to be able to diagnose the device control units in a simple manner. The invention disclosed in Patent Document 1 uses a recording device for collecting data of the vehicle so that the data may be analyzed, and provides a DLC (vehicle diagnosis coupler) on the side of the vehicle for connecting an external diagnosis device thereto. It is known to connect an external diagnosis device to a vehicle to perform various items of diagnosis.

It is also known to enable the control modes of the various onboard devices to be customized so that the properties of the onboard devices may better suit the needs of the vehicle operator. For instance, the properties of onboard devices can be changed by connecting an external control unit to the DLC and having the external control unit change the properties of the onboard devices.

However, the onboard devices that are connected to the CAN may include those related to the motion of the vehicle, and it is not proper to allow the device control units of such onboard devices to be readily accessible and the properties of the onboard devices to be changed at will. Therefore, if the CAN is made readily accessible as proposed in Patent Document 1, the obtained data may not be reliable, and the onboard devices could be tampered in an inappropriate manner.

Means to Accomplish the Task

To eliminate such a problem and allow a control property of an onboard device to be changed by an external control unit while ensuring the reliability of the data used by the external control unit, the present invention provides a vehicle control system comprising a vehicle fitted with a device control unit (12-18) for controlling an onboard device and an interface unit (3) connected to the device control unit, and an external control unit (1) that is configured to access the device control unit via the interface unit, wherein the external control unit comprises an external verification code generating means (1b) for generating a code for accessing the device control unit, an external control signal generating means (1b) for generating an external control signal for controlling the device control unit and an external communication means (1a, 5, 31) for transmitting the external verification code and the external control signal to the interface unit; and wherein the vehicle comprises an internal verification code generating means (3c) for generating an internal verification code for allowing access to the device control unit and an access permitting means (3b) for comparing the external verification code with the internal verification code and permitting control of the device control unit by the external control signal when there is a good match.

According to this arrangement, the device control unit of the vehicle and the external control unit can be readily connected by using the interface unit such as a per se known DLC (vehicle diagnosis coupler). Because the control of the device control unit by the external control signal of the external control unit connected to the device control unit via the interface unit is permitted only when there is a good match between the external verification code and the internal verification code, any unauthorized access is positively prohibited. The onboard device of the vehicle can be controlled by an authorized externally control signal which is verified.

In particular, the external control unit may comprise a portable device installed with a prescribed application program. A mobile phone or other portable device can be used as the external control unit to be connected to the vehicle, and an application program for controlling the onboard device can be easily installed in the portable device. Because a commercially available portable device can be used instead of any specialized device, the convenience of the system can be enhanced. The external verification code may be provided from a server to the portable device. Therefore, by comparing the external verification code obtained from the server with the internal verification code of the vehicle, the system can determine if the control is based on an application program acquired from an authorized server, and can permit an external control by an authorized user without any problem.

Preferably, the device control unit has a first control mode for having the corresponding device to be controlled by the external control signal when the access permitting means has permitted the device control unit to be controlled with the external control signal, and a second control mode for having the corresponding device to be controlled according to a default control mode. According to this arrangement, when there is a good match between the external control signal and the internal control signal, the property of the onboard device can be changed by an external control. Otherwise, the normal control based on a default control mode is performed. Therefore, an abnormal control can be avoided, and the unnecessary lowering of the performance of the existing control property (such as an initial control property) can be avoided.

Preferably, the device control unit comprises a communication state determining means (14b) for determining a state of communication between the interface unit and the external communication means, and is configured to cancel the first control mode when the communication state determining means has determined that the state of communication is abnormal. Thereby, when a normal control by the external control unit is not possible because of an abnormal communication owing to a change in the load of the external control unit or a delay in code verification, the normal control based on the existing control property can be performed, and an erroneous control due to an abnormal communication state can be avoided.

The vehicle may comprise an onboard device contributing to a vehicle motion and an onboard device not contributing to a vehicle motion, and a control of the onboard device contributing to a vehicle motion by the corresponding device control unit in the first control mode is limited when the communication state determining means has determined an abnormal state of communication. According to this arrangement, when the external control unit is unable to perform a normal control, the control amount (drive amount) for the onboard device contributing to a vehicle motion can be reduced or the change in the control amount (drive amount) can be reduced so that a rapid change in the control action of the onboard device contributing a vehicle motion can be avoided.

The vehicle may comprise an onboard device contributing to a vehicle motion and an onboard device not contributing to a vehicle motion, and the access permitting means is configured to permit a control of the onboard device not contributing to a vehicle motion by the external control signal of the external control unit without regard to whether there is a good match or not. Because the vehicle can travel without creating any problem even when the control of the onboard device not contributing a vehicle motion cannot be performed as designed for any reason, there is no problem even if the onboard device can be directly controlled from outside. Therefore, the control of such an onboard device by the external control unit may be permitted without performing the matching of the verification codes so that the convenience of the system can be enhanced, and the load of communication and/or computation can be reduced.

The device control unit may comprise a storage means (14d) for storing information transmitted by the external control signal or a reception signal corresponding to the external control signal and a transmission means (14a) for transmitting information stored in the storage means to the external control unit. The external control unit may comprise a server transmission means for transmitting the stored information to an external server. According to this arrangement, the contents of the control by the external control unit and the record (log) of signal exchanges can be stored, and the record can be transmitted to an external server for storage so that a diagnosis at the time of an abnormal situation can be facilitated.

When the external control signal includes new control data for the second control mode, the control means may store the new control data in the storage means. According to this arrangement, the update and modification of the functions of the control in the second control mode can be performed easily.

The vehicle may comprise a plurality of onboard devices and a plurality of device control units, and when there is a good match, the access permitting means allows the device control units to be accessed through the external control signal simultaneously. Thereby, a plurality of device control units can be accessed simultaneously by a verification of a single verification code so that the convenience of the system can be enhanced, and the load of communication and computation can be reduced.

According to a certain aspect of the present invention, the device control unit is configured to perform a plurality of controls, and the access permitting means is configured to permit the device control unit to operate for each individual control. According to this arrangement, when the device control unit is configured to perform a plurality of functions (such as ABS, automatic braking and yaw moment controls), the various functions may be given with different levels of verification so that the control can be performed while limiting a part of the functions.

The present invention may also provide a vehicle control system comprising a vehicle fitted with a device control unit for controlling an onboard device and an interface unit connected to the device control unit, and an external control unit that is configured to access the device control unit via the interface unit, wherein the external control unit comprises an external control signal generating means for generating an external control signal for controlling the device control unit and an external communication means for transmitting the external control signal to the interface unit, and wherein the system further comprises a load condition determining means for determining a load condition of the external control unit, and an access limiting means (1, 3) for limiting a control of the device control unit by the external control signal when the load condition determining means has determined a large load for the external control unit. According to this arrangement, because the load has increased or the load is predicted to increase when simultaneously controlling a plurality of device control units, the control action of the device control unit is limited so that a delay in the communication response time and an increase in errors due to an increase in the load can be avoided.

Effect of the Invention

Thus, according to the present invention, by matching the verification codes of the device control unit for each thread, the control process can be extended in such a manner that when the vehicle is provided with a plurality of device control units, a control may be performed from outside for each of the device control units. The CPU for the onboard device control unit may be provided with a minimum capability, while the diverse needs of the vehicle operator who may wish to control the onboard control unit in a different way can be met by using a CPU with a high processing capability for the external control unit, so that the onboard device can be controlled with a minimum cost.

BRIEF DESCRIPTION OF THE DRAWINGS

FIG. 1 is a view showing an example of the procedure for external communication in an onboard control system embodying the present invention;

FIG. 2 is a control block diagram showing an external control unit and an onboard device control unit;

FIG. 3 is a flowchart showing the control process according to the present invention;

FIG. 4 is a diagram illustrating the structure of a map for determining control priority; and FIG. 5 is a view similar to FIG. 2 showing an example of a mode of wireless communication.

PREFERRED EMBODIMENT OF THE PRESENT INVENTION

An embodiment of the present invention is described in the following with reference to the appended drawings. FIG. 1 is a view showing an example of the procedure for external communication in an onboard control system embodying the present invention In FIG. 1, a gateway unit 3 is connected to a per se known vehicle diagnostic DLC coupler 2 which is configured to be connected to a connector (not shown in the drawing) provided at an end of a cable of an external control unit 1. The gateway unit 3 is also connected to multiplex communication lines 4a, 4b, 4c which are in turn connected to various device control units 12-18, 21-24 corresponding to various onboard devices (not shown in the drawing) in a CAN. Motion sensors such as a yaw sensor, acceleration sensors and wheel speed sensors and operation detection sensors such as a steering angle sensor, an accelerator pedal sensor, a brake pedal sensor and a shift position sensor S11-S1n are also connected to the multiplex communication lines 4a, 4b, 4c. If the external control unit 1 is incorporated with various sensing devices such as a camera, an acceleration sensor, a touch sensor and a GPS S21-S2n, information from such sensing devices may also be used for the control process.

The various device control units 12-18, 21-24 are configured to control the motion of the vehicle body and the display on the instrument panel, either independently or in cooperation with other device control units, according to the signals from the various sensors S11-S1n provided on the vehicle. For instance, the device control unit 12 controls an electric power steering system, the device control unit 13 controls an engine, the device control unit 14 controls the side slip of the vehicle, the device control unit 15 controls an electronic automatic power transmission system, and the device control unit 16 controls an occupant restraint system. The device control units 12-16 may be configured to control various electric actuators such as an electric brake cylinder for producing braking fluid pressure, an electric pump and solenoid valves for controlling the brake fluid pressure of the four wheels, an electric motor for actuating a steering rack and an electric throttle valve for a drive-by-wire control which contribute to the motion of the vehicle.

For instance, the device control unit 17 may control a combination meter, and the device control unit 18 may control audio devices. Such device control units are thus configured to control onboard devices that are note related to the motion of the vehicle. These device control units 12-18 may be packaged with the associated onboard devices, respectively, and may perform the various control actions by exchanging information with one another via the CAN.

A mode of control operation according to the present invention is described in the following with reference to FIG. 2. The external control unit 1 may consist of a portable device such as a portable terminal equipped with mobile phone functions and network functions, and may be provided with a cable fitted with a connector 5 serving as an external communication means and configured to be connected to the DLC coupler 2. The external control unit 1 is internally provided with an interface unit 1a serving as an external communication means for communication with the gateway unit 3, an application control unit 1b connected to the interface unit 1a and serving as an external verification code generating means and an external control signal generating means, a CPU 1c for controlling these and other functions and a memory unit 1d.

The external control unit 1 may also be configured to be connected to a per se known service provider 6 on the network by using the network function and to a server 7 that manages the overall control system. The service provider 6 functions as an intermediary that affords direct or indirect access to the contents and data in the server 7. The service provider 6 is provided with an application supply unit 6a that can sell (or provide) application programs for controlling the various device control units 12-18 via the network. The server 7 includes a verification code information providing unit 7a for providing a verification code ID2 for verifying the application programs and an additional information unit 7b for supporting a comfortable operation of the vehicle, for instance, by supplying car navigation information.

The gateway unit 3 is internally provided with an interface unit 3a connected to the DLC coupler 2, a main control logic unit 3b serving as an access permitting means that performs the main control of the gateway unit 3 and a verification code generator 3c serving as an internal verification code generating means.

As shown by the example of the device control unit 14 in FIG. 2, each of the device control units 12-16 is internally provided with an interface unit 14a serving as a transmission means connected to the multiplex communication line 4a, a main control logic unit 14b serving as a communication state determining means that performs the main control of the device control unit 14 and an actuator control unit 14c for controlling the actuation of the electric actuator that is to be controlled.

The device control units 17 and 18 are described in the following by the example of the device control unit 18 shown in FIG. 2. As shown in the drawing, the device control unit 18 is internally provided with an interface control unit 18a connected to the multiplex communication line 4a, a main control unit 18b for performing the main control of the device control unit 18 and an electric circuit control unit 18c for controlling switches and an image processing circuit that are to be controlled.

The mode of control operation in controlling the various device control units 12-18 by the external control unit 1 is described in the following with reference to FIG. 2. An application program (including the verification code ID2) which is purchased and downloaded from the service provider 6 is installed (or otherwise incorporated) in the application control unit 1b of the external control unit 1 in advance. The service provider 6 and the server 7 may be configured such that application programs that allow the control contents of the various device control units to be directly modified are provided from the server 7, and access information (such as transmission information from the application programs to the device control units 12-18 and information acquired by the application programs from the various device control units 12-18) which is generated when the various device control units 12-18 are accessed by the application programs may be received and managed by the server 7 through mutual communication between the service provider 6 and the server 7.

When controlling any one of the device control units, the device control unit 14 for instance, from the external control unit 1 by using an application program downloaded from the service provider 6 and installed in the application control unit 1b, first of all, the connector 5 of the external control unit 1 is connected to the DLC coupler 2. By operating keys on the display unit (in the case of a touch panel) of the external control unit 1, signals are exchanged between the external control unit 1 and the gateway unit 3 as indicated by the solid line arrows in FIG. 2.

In FIG. 3, the control flow for the external control unit 1 is indicated by steps S101-S111, and the control flow for the gateway unit 2 is indicated by steps S201-S208. The control flow of the device control units 12-18, 21-24 is indicated by steps S301-S309 by taking the example of the device control unit 14. There are two control modes, the first control mode consisting a control process performed by the external control unit 1 and freely configurable to some extent by using an application program, and the second control mode consisting a default control mode (installed at the time of leaving the manufacturing plant) which is suitable for performing basic control functions.

In step S101, the external control unit 1 acquires program data. In step S102 and step 201, the external control unit 1 and the gateway unit 3 perform verification processes based on a general-purpose protocol by using a known encrypting technology for two-way communication between them. A wired communication is used in the example of FIG. 2, and a wireless communication is used in the example of FIG. 5 which will be described hereinafter. The system of the illustrated embodiments can be thus configured for both wired and wireless communications. Therefore, a verification of wireless communication is performed as a part of communication establishing process in the steps of S102 and S201, but when a wired communication is used, no verification process is performed before the system control advances to the subsequent steps.

In step S103, the external control unit 1 starts an external control program based on the application program which was installed earlier, and a thread in the program process is generated in step S104. A new thread is generated every time the application control unit 1b accesses the control function for the device control unit 14, and a security key Ky2 corresponding to this thread is created. A request message RS is transmitted in step S105 that follows.

Upon receiving the request message RS, the gateway unit 3 creates a security code and transmits the same as a key request signal in step S202. At the same time, a security key Ky1 is created by the verification code generator 3c as a verification code.

Upon receiving the key request signal, the external control unit 1 transmits the security key Ky2 created as a verification code based on the security code from the gateway unit 3 and an encryption constant of the application program by using a physical address in step S106.

In step S203, the gateway unit 3 compares the security key Ky1 with the received security key Ky2, and if there is a match, transmits a signal that permits the control by the external control unit 1. If the security key Ky2 is found to be invalid, no control permit signal is transmitted, and the program is prevented from advancing beyond step S204.

In step S107 that follows step S106, the external control unit 1 transmits a control signal CODE generated by an internal computation to start the control by the external control unit 1. The security key Ky2 may be computed by the external control unit 1 as a different value for each particular external control (or for each program ID). This can be accomplished, for instance, by registering a constant for computing the security key Ky2 in a file of the application program for each different program ID.

In step S204, the gateway unit 3 transmits a control signal according to the control signal CODE from the external control unit 1 to control the device control unit 14 in the first control mode. In step S205 that follows, it is determined if a prescribed time period has elapsed. The prescribed time period may start upon starting of the control or upon transmission of the control signal in step S204, for instance. When the elapsing of the prescribed time period has been determined in step S205, the program flow advances to step S206. In step S206, the verification code generator 3c generates a security key Ky1 as a verification code, and transmits a key update request.

In step S108 that follows step S 107, the external control unit 1 determines if there is a key update request from the gateway unit 3. If there is a key update request, the program flow advances to step S109 where the security key Ky2 is updated and the program flow returns to step S106. By forcing the updating of the security key Ky2 in the prescribed time period from the start of the control in this manner, the control can be performed properly in a verified manner at all times. If there is no key update request, the program flow advances to step S110.

In step S301, the device control unit 14 diagnoses the sensors and actuators that are involved in the control process. In step S302 that follows, it is determined if the actuators are available for the control process, and if any one of the actuators is not available, the current routine is terminated. If the actuators are all available, the program flow advances to step S303. The second control mode is initiated in step S303, and the control based on the second control mode is executed according to the sensor signals from the various sensors S11-S1n, S21-S2n in step S304 that follows. The second control mode may be stored in the memory unit 14d of the device control unit 14 serving as a storage means so as not to be modified by the control CODE which will be described hereinafter, and may be configured to perform the control in the basic default control mode which was installed when the system leaves the manufacturing plant.

In step S305 that follows step S304, it is determined if a priority can be given to an external signal from the external control unit 1, and if no priority can be given, the current routine is terminated. If a control of any control object is already being executed, the control to be prioritized can be determined, for instance, by preparing a map defining the priority orders of the devices and control signals for each control object as shown in FIG. 4. For instance, the gateway devices are given highest priorities (the second control mode), and external devices (the first control mode) are given lower priorities. When competing control signals are received from internal devices including gateway devices and external devices at the same time, the internal devices are given higher priorities. The control command codes (control signals) are also given with priority levels such that some of the low level control commands are not executed even when received from external devices ("not executable" in FIG. 4). Alternatively, some of the low level control commands can be executed only when control commands of higher levels are not being executed.

When an external signals is given a high priority in step S305, the program flow advances to step 5306 where the main control logic unit 3b performs the control on the device control unit 14 in the first control mode. In step S307 that follows, a control is executed based on the signals from the external sensors S21-S2n incorporated in the external control unit 1 and the results of the computation process of step S107, for instance. In the first control mode, when the external control unit 1 is incorporated with sensors such as an acceleration sensor, a touch panel, operation buttons, a camera and a GPS, for instance, information on such sensors is utilized for the control. When the external control unit 1 is incorporated with an electronic money function, the associated electronic money information is utilized for the control.

When the device control unit 14 consists of a device (VSA) that can control a plurality of functions such as ABS, automatic brake and yaw moment control, the external control unit 1 can freely control the front and rear braking force ratio and the ratio of the throttle valve opening angle to the depression stroke of the accelerator pedal. Other onboard devices using electric actuators contributing to the motion control of the vehicle can also be controlled from outside, but the range of control in such a situation should be limited such that the motion of the vehicle does not excessively deviate from an initially defined range as can be readily appreciated by a person skilled in the art.

In step S308 following step S307, it is determined if the control mode is to be switched to the internal control mode (second control mode), and if not, the program flow returns to step S306 to continue the control in the first control mode. A switch over to the second control mode occurs in the case of a communication failure due to changes in the load of the external control unit 1, and the failure for the external control unit 1 to perform a normal control action due to a delay in code verification. For this reason, there is provided a load condition determining means. When a switch over is to take place, the program flow advances to step S309 where a transition mode for effecting a transition to the second control mode is executed before the current routine by the device control unit 14 is terminated. When the first control mode is terminated, either the second control mode is gradually resumed or the control action is stopped altogether. By switching over to the second control mode consisting of a default mode, any faulty control action due to any failure such as communication errors can be avoided.

In step S110, the external control unit 1 determines if the load of the communication environment has exceeded a prescribed limit or if the control action has been terminated, and if the load of the communication environment has not exceeded the prescribed limit and the control action has not been terminated, the program flow returns to step S104 to continue the control action. When it is detected that the prescribed limit has been exceeded or the control action has been terminated, the program flow advances to step S111 where the control is terminated and the communication is disconnected before the control action in the external control unit 1 is forced into termination. Exceeding of the prescribed limit may be detected not only when the load has actually exceeded the prescribed limit but also when it is predicted that the load will exceed the prescribed limit. The termination of the control action may be effected by termination of a part of plural control actions that are being executed in any one of the device control units 12-18, 21-24.

In step S207 that follows step S206, the gateway unit 3 determines if the control condition is abnormal (NG) or not. If the control condition is normal, the program flow returns to step S203 to continue the control action. If any control value exceeding a permitted range is detected for any reason, the program flow advances to step S208 where the control by the current routine is forced into termination.

The limiting or terminating control function in steps S110 and S207 may be incorporated in the application program of the external control unit 1 or the control program of the gateway unit 3 as an access limiting means. An increase in the load occurs during a telephone call, a telephone ringing, a video playback or a multiple control of the device control units 12-18, 21-24. When the load has increased or is predicted to increase or when a delay in the communication response or an increase in errors has occurred, the limiting or terminating control function is initiated. When a plurality of device control units are simultaneously controlled, only a part of the control may be terminated or limited.

It is possible to allow a plurality of device control units to be accessed simultaneous by a single verification using a single security key Key1 (verification code). The device control unit 14 is given as a representative example in FIG. 2, but the system may be configured such that once a correct matching between the security keys Key1 and Key2 is made, other device control units may also be enabled without requiring to be verified by the external control unit 1 all over again. Thereby, the convenience of the system can be enhanced, and the load of communication and computation can be reduced.

As the memory unit 14*d* stores information transmitted by the control signal CODE as an external control signal or a reception signal corresponding to the control signal CODE, the contents of the signal can be transmitted to the external control unit 1 upon request from the external control unit 1. Therefore, the contents of the control and the record (log) of the signal exchange performed by the external control unit 1 can be stored, and transmitted to the external server 7 via the external control unit 1 to be stored in the server 7. This information can be used for diagnosing an abnormal condition, and allows a failure to be diagnosed both easily and quickly.

In the case of controlling an onboard device that does not contribute to the motion of the vehicle such as an audio device by using the device control unit 18, as the traveling condition of the vehicle is not affected even when the control mode for the onboard device is changed, the matching of the security keys Ky1 and Ky2 may be omitted. In such a case, the request message that has been in place for the application program of the control unit 18 since the time when the connector 5 and the DLC coupler 2 were connected to each other, the exchange of control signals CODE between the external control unit 1 and the device control unit 18 can be performed directly through the interface unit 3*a* as indicated by the double-dot chain-dot line in FIG. 2. Thereby, the verification process is not required to be performed for each and every application program so that the convenience of the system can be enhanced, and the load of communication and computation can be reduced.

The external control unit 1 can communicate with the server 7. As discussed earlier, the server 7 is provided with a verification information providing unit 7*a* and an additional information unit 7*b*, and is configured to transmit the data for an application program. In response to this transmission, the application control unit 1*b* of the external control unit 1 generates a thread, computes a security key Ky2, performs a control computation, and generates a control signal (communication code) CODE. The external control unit 1 may transmit control and diagnosis data, and other pertinent information to the server 7. Thereby, the contents of the control and the record (log) of the signal exchange can be stored in the server 7 so that a diagnosis of a failure can be easily performed by comparing the obtained data with the data store in the server 7.

FIG. 2 shows an example where the connector 5 and the DLC coupler 2 are connected to each other via a wired connection, but it is also possible to connect the connector 5 with the DLC coupler 2 via a wireless connection. Such an example is illustrated in FIG. 5. In FIG. 5, the parts corresponding to those of the previous embodiment are denoted with like numerals without repeating the description of such parts.

Referring to FIG. 5, the external control unit 1 is provided with an antenna 31 serving as an external communication means, and the gateway unit 3 is likewise provided with an antenna 32. The device control unit 18 not contributing to the motion of the vehicle is also provided with an antenna 33. The external control unit 1 and the gateway unit 3 can be connected by a two-way communication by using a verification process based on a per se known encryption technology. The verification process of the communication may be based on any method, but if the system is configured to require a verification for communication as in the previous embodiment, an external control is prevented from being executed without a proper verification process. Preferably, the establishment of the communication and/or the execution of the control signal may be limited by a key unique to each vehicle. Thereby, the two devices are connected by wireless communication, and the same effect as that of the previous embodiment can be achieved with the only difference being whether the communication is wired or wireless. If desired, the antennas 31 and 33 may directly communicate with each other so that the control signal CODE may be directly transmitted from the external control unit 1 to the device control unit 14 without involving the gateway unit 3. Thus, the need for verification for the execution of the application program by the device control unit 14 is done away with so that the convenience of the system can be enhanced, and the load of communication and computation can be reduced. The antennas and signal processing devices used in this embodiment may consist of general-purpose antennas and signal processing devices.

The gateway unit 3 may be provided with a virtual area 3d via which the device control unit 14 may be controlled. Thereby, the load generated in association with the input and output process into and out of the external control unit 1 is prevented from affecting other device control units. The virtual area 3d may be provided only with the functions of verification and signal transmission and reception, but may also take over at least a part of the computing function of the external control unit 1. In such a case, the gateway unit 3 may be used as a back-up for the device control units 12-18, 21-24, and for monitoring other units.

According to the present invention, because an external control from the external control unit 1 is enabled, the display function and/or the input function may be substituted by the display 1a and/or the sensors S21-S2n of the external control unit 1. In such a case, as indicated by the double-dot chain-dot line in FIG. 1, without using the onboard devices that are conventionally provided in a vehicle, such as a head-up display device 21, a car navigation device 22, an auto cruise control device 23 and a lane following control device 24, such functions can be extended or substituted by providing a corresponding application program to the external control unit 1. By allowing the motion of the vehicle to be controlled from outside via an external control unit, the property of the vehicle may be adjusted, and additional functions may be included in the vehicle so as to adapt to the preference of the user while the behavior of the vehicle is positively prevented from compromising the safety of the vehicle.

GLOSSARY 1 external control unit (portable device, access limiting means)
1a interface unit (external communication means)
1b application control unit (external verification code generating means, external signal generating means)
3 gateway unit (interface unit, access limiting means)
3b main control logic unit (access permitting means)
3c verification code generating means (internal verification code generating means)
5 connector (external communication means)
12-18 device control unit
14a interface unit (transmitting means)
14b main control logic unit (communication state determining means)
14d memory unit (storage means)
31 antenna (external communication means)

The invention claimed is:

1. A vehicle control system comprising a vehicle fitted with a device control unit for controlling an onboard device and an interface unit connected to the device control unit, and an external control unit that is configured to access the device control unit via the interface unit,
   wherein the external control unit comprises an external verification code generating means for generating a code for accessing the device control unit, an external control signal generating means for generating an external control signal for controlling the onboard device and an external communication means for transmitting the external verification code and the external control signal to the interface unit;
   wherein the vehicle comprises an internal verification code generating means for generating an internal verification code for allowing access to the device control unit via the interface unit and an access permitting means for comparing the external verification code with the internal verification code and permitting control of the onboard device by the external control signal when there is a good match;
   wherein the device control unit is provided with a first control mode for having the onboard device be controlled by the external control signal generated by the external control signal generating means of the external control unit while the vehicle is traveling when the access permitting means has permitted the onboard device to be controlled by the external control signal, and a second control mode for having the onboard device be controlled according to a default control mode;
   wherein when the device control unit is operating in the first control mode, the device control unit determines whether the control mode is to be switched to the second control mode, and if it is determined that the control mode is to be switched, the device control unit transitions from the first control mode to the second control mode; and
   wherein the system further comprises a load condition determining means for determining a load condition of the external control unit, and an access limiting means for limiting a control of the onboard device by the external control signal when the load condition determining means has determined a large load for the external control unit.

2. The vehicle control system according to claim 1, wherein the external control unit comprises a portable device installed with a prescribed application program.

3. The vehicle control system according to claim 2, wherein the external verification code is provided from a server to the portable device.

4. The vehicle control system according to claim 1, wherein the device control unit comprises a communication state determining means for determining a state of communication between the interface unit and the external communication means, and is configured to cancel the first control mode when the communication state determining means has determined that the state of communication is abnormal.

5. The vehicle control system according to claim 1, wherein the vehicle comprises an onboard device contributing to a vehicle motion and an onboard device not contributing to a vehicle motion, and the device control unit comprises a communication state determining means for determining a state of communication between the interface unit and the external communication means, a control of the onboard device contributing to a vehicle motion by the corresponding device control unit in the first control mode being limited when the communication state determining means has determined an abnormal state of communication.

6. The vehicle control system according to claim 1, wherein the vehicle comprises an onboard device contributing to a vehicle motion and an onboard device not contributing to a vehicle motion, and the access permitting means is configured to permit a control of the onboard device not contributing to a vehicle motion with the external control signal when the external control signal is for the control of the onboard device not contributing to a vehicle motion without regard to whether there is a good match or not.

7. The vehicle control system according to claim 1, wherein the device control unit comprises:

a storage means for storing information transmitted by the external control signal or a reception signal corresponding to the external control signal; and a transmission means for transmitting information stored in the storage means to the external control unit.

8. The vehicle control system according to claim 7, wherein when the external control signal includes new control data for the second control mode, the control means stores the new control data in the storage means.

9. The vehicle control system according to claim 1, wherein the vehicle comprises a plurality of onboard devices and a plurality of device control units, and when there is a good match, the access permitting means allows the onboard devices to be accessed through the external control signal simultaneously.

10. The vehicle control system according to claim 1, wherein the device control unit is configured to perform a plurality of controls, and the access permitting means is configured to permit the device control unit to operate for each individual control.

* * * * *